United States Patent [19]

Tsukiji

[11] 4,097,175
[45] Jun. 27, 1978

[54] MACHINE FOR DRILLING HOLES IN RIGHT-ANGULAR WORK SURFACES

[75] Inventor: Yoshihiro Tsukiji, Komatsu, Japan

[73] Assignee: Kabushiki Kaisha Komatsu Seisakusho, Tokyo, Japan

[21] Appl. No.: 757,057

[22] Filed: Jan. 5, 1977

[51] Int. Cl.$^2$ ................. B23B 39/14; B23B 41/00
[52] U.S. Cl. .................................... 408/23; 408/88; 408/126; 408/234; 29/26 R; 90/17
[58] Field of Search ............... 408/23, 88, 99, 111, 408/126, 129, 35, 234 A; 90/14, 17; 29/26 R

[56] References Cited

U.S. PATENT DOCUMENTS

| 496,273 | 4/1893 | Mill | 408/23 X |
|---|---|---|---|
| 3,448,656 | 6/1969 | Bottger et al. | 90/17 |
| 3,703,027 | 11/1972 | Geyler | 408/35 |
| 3,830,584 | 8/1974 | Ohlig et al. | 408/35 |

FOREIGN PATENT DOCUMENTS

| 1,340,715 | 9/1963 | France | 408/88 |

Primary Examiner—Gil Weidenfeld
Attorney, Agent, or Firm—Armstrong, Nikaido, Marmelstein & Kubovcik

[57] ABSTRACT

A drilling machine comprises a ram movable up and down on a carriage slidably mounted on a horizontal crossrail. A toolhead is mounted on the bottom end of the ram for pivotal movement about a horizontal axis at right angles with the crossrail and is pivoted to a desired angular position by a first drive shaft within the ram via bevel gearing. Rotatably mounted in the toolhead for rotation about an axis lying in a vertical plane is a toolholder which rigidly supports a drill and which is driven from a second drive shaft within the ram via bevel gearings. Preferably, the machine further comprises a rack-and-pinion mechanism driven from the second drive shaft for securely but releasably locking a turning tool at the bottom end of the ram, so that the machine can be used also for turning operation as a workpiece is rotated on a turntable. This turntable is of course held stationary during drilling operation.

12 Claims, 5 Drawing Figures

U.S. Patent   June 27, 1978   Sheet 3 of 4   4,097,175
FIG. 3
FIG. 4
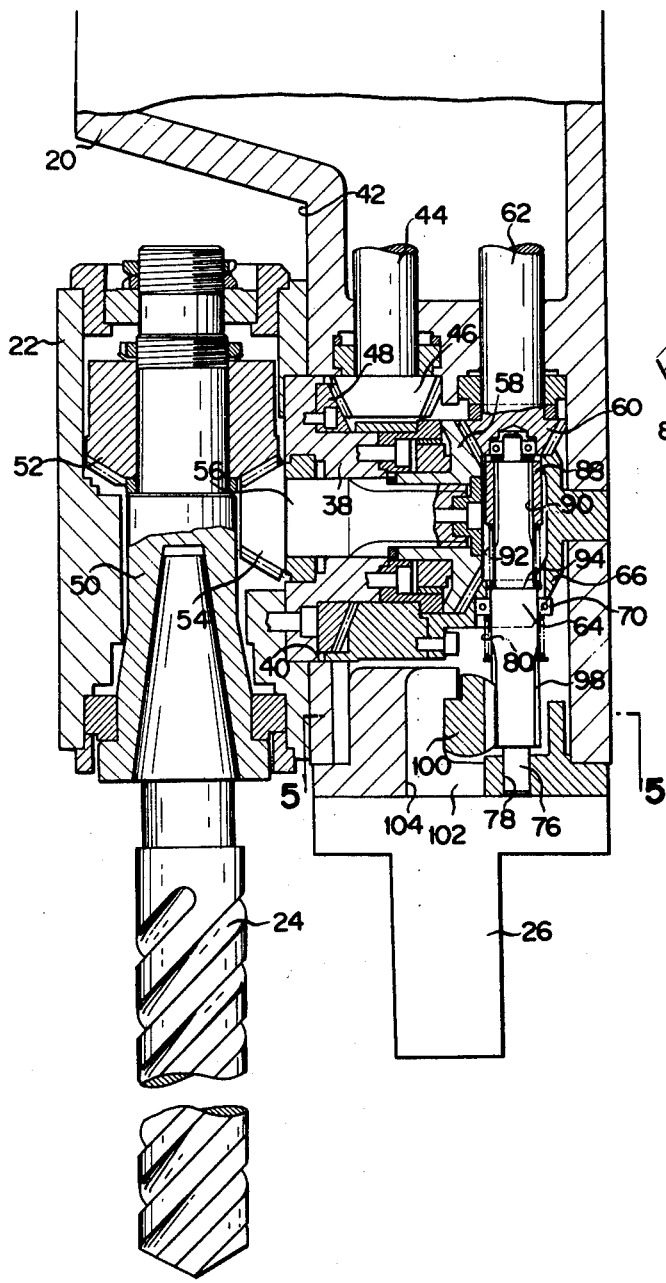
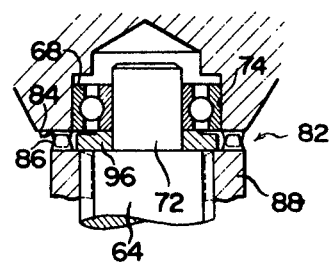

MACHINE FOR DRILLING HOLES IN RIGHT-ANGULAR WORK SURFACES

BACKGROUND OF THE INVENTION

This invention relates to machine tools and is directed more specifically to a machine for drilling holes in right-angular surfaces of a workpiece. The invention also specifically deals with such a drilling machine which readily lends itself to various turning operations as well.

Heretofore, for creating holes in two right-angular surfaces of a workpiece, there has been usually employed a drilling machine comprising two toolheads each having a rotary cutting tool for drilling one of the workpiece surfaces. Such a dual-head drilling machine requires separate means for providing rotary and feed motion for the respective cutting tools, as well as separate means for adjusting the positions of the respective tools with respect to a workpiece. As a consequence, the drilling machine has been unnecessarily complex in construction and expensive of manufacture.

SUMMARY OF THE INVENTION

It is an object of this invention to provide a simplified, inexpensive machine tool which has only one toolhead but which is capable of producing holes at desired points on right-angular surfaces of a workpiece.

Another object of the invention is to provide a machine tool of the above described character which is readily adaptable for a variety of turning operations.

Briefly, this invention provides, in a machine tool of the type specified, the combination comprising a crossrail extending parallel to the surface of a table on which is to be mounted a workpiece to be machined. A carriage movable along the crossrail supports a ram which is itself movable toward and away from the table relative to the carriage. On one end of the ram, disposed opposite to the table, there is mounted a toolhead which is pivotable relative to the ram about an axis at right angles with the crossrail and parallel to the surface of the table. Rotatably mounted in the toolhead is a toolholder which rigidly supports a rotary cutting tool such as a drill and which is rotatable therewith about an axis lying in a plane parallel to the crossrail and at right angles with the surface of the table. The combination according to the invention further comprehends means for pivoting the toolhead relative to the ram, and means for imparting rotation to the toolholder and therefore to the cutting tool supported thereby.

Thus, according to this invention, the single rotary cutting tool rotatably supported by the pivotal toolhead via the toolholder can be pivoted to and locked in a disposition either perpendicular or parallel to the surface of the table. Since the desired rotary and feed motion can be imparted to the cutting tool in either disposition, holes can be produced in right-angular surfaces of a workpiece on the table by use of the single cutting tool.

According to a further feature of this invention, means are provided for securely but releasably locking a turning tool in position on the ram. In the preferred embodiment of the invention, the locking means include a rack-and-pinion mechanism actuated via a clutch by a drive shaft which, during drilling operation, drives the rotary cutting tool. When the turning tool is mounted in position on the ram, the clutch becomes engaged to permit the drive shaft to actuate the rack-and-pinion mechanism, whereupon the latter operates to secure the turning tool to the ram by wedging action. The aforesaid table is made rotatable to permit rotation of a workpiece relative to the turning tool, so that the machine tool according to the invention can be conditioned for turning operation simply by mounting the turning tool in position on the ram. The table will be referred to as the turntable in the subsequent description of the preferred embodiment.

The above and other objects, features and advantages of this invention and the manner of attaining them will become more apparent, and the invention itself will best be understood, upon consideration of the following description taken together with the accompanying drawings.

BRIEF DESCRIPTION OF THE DRAWINGS

FIG. 3 is an enlarged, fragmentary vertical sectional view taken along the line 3—3 of FIG. 1;

FIG. 4 is a fragmentary vertical sectional view showing, on a still more enlarged scale, that portion of FIG. 3 which is surrounded by a circle.

DESCRIPTION OF THE PREFERRED EMBODIMENT

Figure 1:
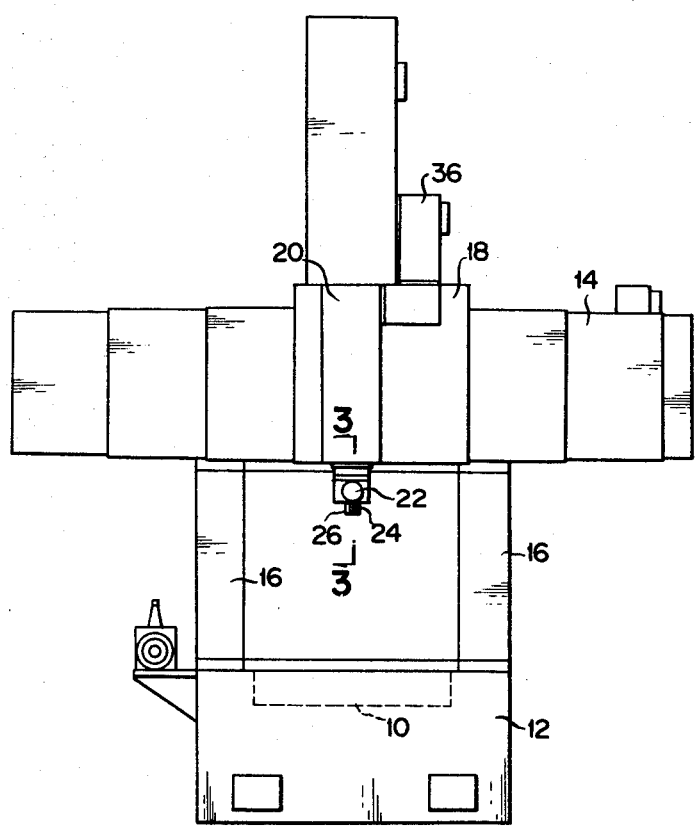
FIG. 1 is a front elevational view of a drilling and turning machine constructed in accordance with the novel concepts of this invention.
Figure 2:
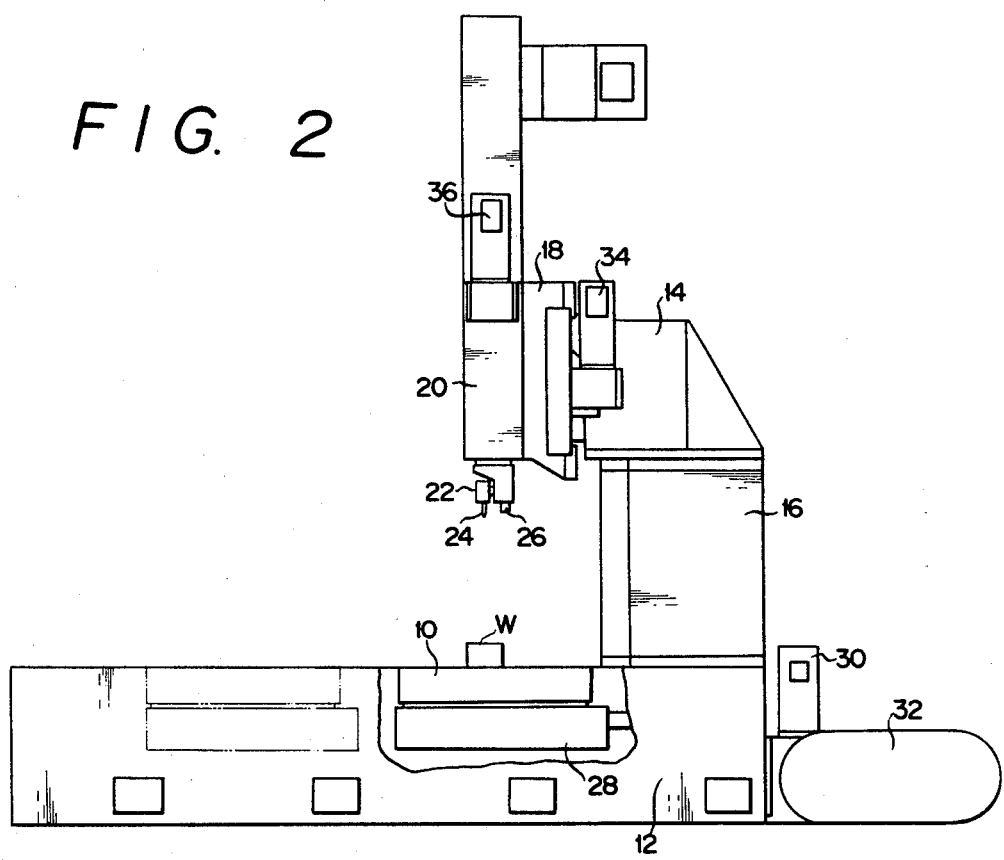
FIG. 2 is a right hand side elevational view of the machine of FIG. 1.

In the accompanying drawings this invention is shown adapted for a combined drilling and turning machine. With reference first to FIGS. 1 and 2, the drilling and turning machine broadly comprises a turntable 10 rotatably supported in a base or pedestal 12 of generally boxlike shape, a crossrail 14 mounted on a pair of columns 16 erected on the base and extending horizontally or parallel to the surface of the turntable, a carriage 18 slidably mounted on the crossrail for movement therealong, a ram 20 mounted on the carriage for movement toward and away from a workpiece W on the turntable, a toolhead 22 having a rotary cutting tool or drill 24 and pivotally mounted on the bottom end of the ram, and a turning tool 26 removably mounted on the bottom end of the ram for interchangeable use with the drill. It will be noted from the drawings that the machine is of substantially symmtrical construction, unlike the prior art dual-head drilling machine mentioned previously, so that it will suffer little from possible thermal expansion or contraction with changes in ambient temperature.

The turntable 10 may be rotatably mounted on a carriage 28 which is reciprocally movable relative to the base 12 between a working position indicated by the solid lines in FIG. 2 and a standby position indicated by the dot-and-dash lines in the same drawing. Such reciprocating motion of the carriage 28 and therefore of the turntable 10 is effected by a servomotor shown at 30.

FIGS. 1 and 2 further illustrate a motor 32 for rotating the turntable 10, a servomotor 34 for moving the carriage 18 along the crossrail 14, and a servomotor 36 for moving the ram 20 toward and away from the workpiece W.

As illustrated in greater detail in FIG. 3, the toolhead 22 is substantially integrally provided with a sleeve 38 which is rotatably received in a hole 40 formed in the recessed front surface 42 of the ram 20. The toolhead 22 is therefore pivotable relative to the ram 20 about the axis of the sleeve 38, which axis extends at right angles with the crossrail 14 and parallel to the surface of the turntable 10.

For thus pivoting the toolhead 22, there is provided a first drive shaft 44 arranged vertically within the ram 20 and terminating in a bevel pinion 46. This bevel pinion is in mesh with a bevel gear 48 coaxially surrounding the sleeve 38 and rigidly fastened thereto. The rotation of the first drive shaft 44 can therefore be transmitted through the bevel gearing 46, 48 to the sleeve 38 for pivoting the toolhead 22 to a desired angular position relative to the ram 20.

Rotatably supported within the toolhead 22 is a toolholder 50 securely holding the drill 24, with the toolholder being rotatable with the drill about an axis lying in a plane parallel to the cross rail 14 and at right angles with the surface of the turntable 10. This toolholder 50 is substantially integrally provided with a bevel gear 52 which is in mesh with a bevel gear 54 formed at the left hand end, as seen in FIG. 3, of a spindle 56 rotatably received in the sleeve 38. The right hand end of the spindle 56, projecting out of the sleeve 38, is also formed into a bevel gear 58 which is in mesh with a bevel pinion 60 formed at the bottom end of a second drive shaft 62 rotatably supported within the ram 20 in side-by-side relationship to the first drive shaft 44.

The rotation of the second drive shaft 62 is therefore transmitted to the spindle 56 through the bevel gearing 58, 60 and thence to the toolholder 50 through the bevel gearing 52, 54. The drill 24 can thus be driven from a suitable drive source, not shown, connected to the second drive shaft 62.

Besides driving the drill 24, the second drive shaft 62 is also utilized for releasably locking the turning tool 26 in its working position at the bottom end of the ram 20 through the following means.

Under the second drive shaft 62 and in axial alignment therewith, a pinion shaft 64 is supported by a bracket 66 via bearings 68 and 70 so as to be both rotatable and movable endwise toward and away from the second drive shaft. The pinion shaft 64 terminates at its top in a journal 72 of reduced diameter neatly received in the bearing 68 which is slidably fitted in an axial bore 74 of the second drive shaft 62, as illustrated on an enlarged scale in FIG. 4. At its bottom the pinion shaft 64 terminates in a push button 76, also of reduced diameter, slidably extending through a hole 78 formed in the bottom of the ram 20. The pinion shaft 64 is biased away from the second drive shaft 62 by a helical compression spring 80, so that when the turning tool 26 is not mounted in its working position shown in FIG. 3, the push button 76 projects downwardly out of the hole 78 under the bias of the compression spring 80.

As best seen in FIG. 4, a jaw clutch generally labelled 82 is provided for connecting the second drive shaft 62 to the pinion shaft 64 in driving relationship when the latter is moved upwardly by the turning tool 26 via the push button 76 against the bias of the compression spring 80.

The jaw clutch 82 comprises a first clutch face 84 formed on the bottom end of the second drive shaft 62, or on the bevel pinion 60, and a second clutch face 86 formed on the opposed top end of a sleeve 88 on the pinion shaft 64 for interlocking engagement with the first clutch face. The sleeve 88 is splined at 90 to the pinion shaft 64 so as to be rotatable simultaneously therewith but movable up and down relative to same. A helical compression spring 92 extends between the bottom end of the sleeve 88 and a step 94 of the pinion shaft 64 for biasing the sleeve upwardly relative to the pinion shaft, and the upward motion of this sleeve is limited by a stop ring 96 fixedly mounted between the top shoulder of the pinion shaft 64 and the bearing 68.

Thus, upon upward motion of the pinion shaft 64, the jaw clutch 82 becomes engaged to transmit the rotation of the second drive shaft 62 to the sleeve 88 and thence to the pinion shaft 64. Upon removable of the turning tool 26, the jaw clutch 82 becomes disengaged as then the pinion shaft 64 moves downwardly under the bias of the compression spring 80 together with the sleeve 88, stop ring 96 and bearing 68.

Figure 5:
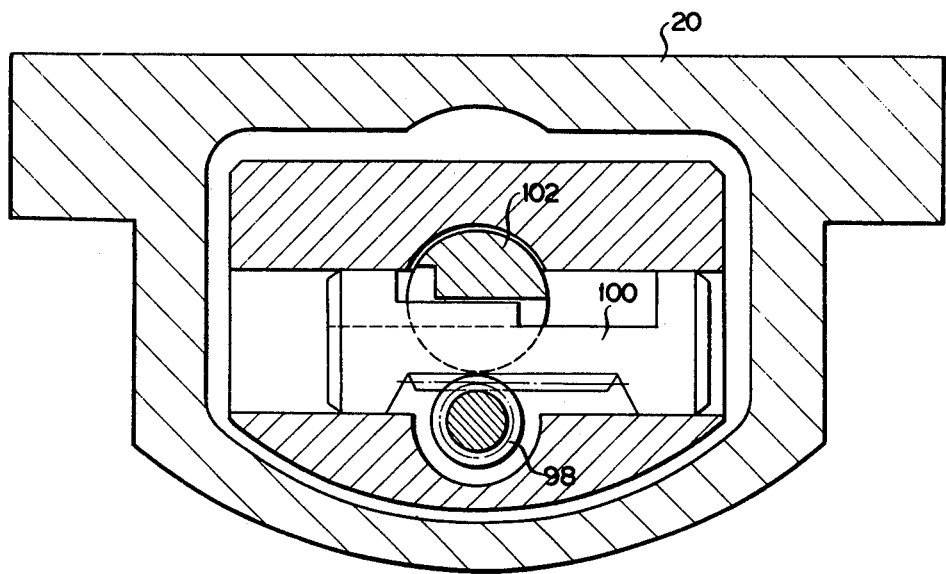
FIG. 5 is a horizontal sectional view, also on a still more enlarged scale, taken along the line 5—5 of FIG. 3.

As will be seen from FIGS. 3 and 5, the pinion shaft 64 is formed into a pinion 98 at its bottom end portion. The pinion 98 is in constant mesh with a rack 100 slidably mounted within the ram 20 for movement into and out of engagement with a base portion 102 of the turning tool 26 received in a mounting hole 104 formed in the bottom of the ram. The rack 100 is adapted to serve as a wedge which, when driven into engagement with the base portion 102 of the turning tool 26 by the pinion 98 upon engagement of the jaw clutch 82, is effective to securely lock the turning tool in its working position by wedging action.

OPERATION

Although the operation of the combined drilling and turning machine according to the invention is believed clearly apparent from the foregoing description, further amplification will be made in the following brief summary of such operation. The machine can be conditioned for drilling operation simply by removing the turning tool 26 from the ram 20. For drilling a hole in the top surface of the workpiece W on the turntable 10, the toolhead 22 may be pivoted to such an angular position relative to the ram 20 that the drill 24 is disposed vertically as shown in FIGS. 1 through 3.

The second drive shaft 62 may then be set in rotation to drive the drill 24 via the bevel gearing 58, 60, the spindle 56, the bevel gearing 52, 54, and the toolholder 50. The top surface of the workpiece W can be drilled as the revolving drill 24 is fed into the workpiece mounted on the turntable 10 in its working position. The rotation of the second drive shaft 62 is not transmitted to the pinion shaft 64 since now the jaw clutch 82 is disengaged, with the pinion shaft held away from the second drive shaft under the bias of the compression spring 80.

For drilling another hole in a side surface of the workpiece W at an angle of 90° from its top surface, the first drive shaft 44 may be set in rotation to pivot the toolhead 22 about the axis of the sleeve 38 via the bevel gearing 46, 48 until the drill 24 is turned 90° in either direction from its vertical disposition. The position of the drill 24 with respect to the workpiece W may also be adjusted as required by moving the carriage 18 and the ram 20. The side surface of the workpiece can be drilled as the drill 24 is then both rotated and fed into the workpiece.

For the use of the machine for turning operation, the turning tool 26 may be mounted in its working position best shown in FIG. 3 by inserting its base portion 102 into the mounting hole 104 at the bottom of the ram 20. As the turning tool base portion 102 is inserted fully into the mounting hole 104, the push button 76 is pushed into the hole 78 to move the pinion shaft 64 upwardly against the bias of the compression spring 80, so that the jaw clutch 82 becomes engaged to connect the second drive shaft 62 to the pinion shaft 64 in driving relationship.

As the second drive shaft 62 is subsequently set in rotation, therefore, the pinion shaft 64 is thereby rotated via the sleeve 88, and by the consequent rotation of the pinion 98, the rack 100 is forced into engagement with the base portion 102 of the turning tool 26 for securely locking same in position on the ram 20 by wedging action. A desired turning operation can be performed on the workpiece W as same is rotated by the turntable 10.

It should be appreciated that since the turning tool 26 is mounted directly on the ram 20 and securely locked in position by the rack-and-pinion mechanism driven from the second drive shaft 62, the turning tool can be held rigidly supported during turning operation, so that the workpiece can be cut to the desired shape with a high degree of accuracy. In practice, turning tools of various types and sizes may be prepared for interchangeable use, thereby adapting the machine for a variety of turning operations including internal and external cuttings.

While the machine tool in accordance with this invention has been shown and described in terms of its preferred form, it is understood that the invention itself is not to be restricted by the exact details of this disclosure, since numerous modifications and adaptations within the usual knowledge of those skilled in the art may be resorted to without departing from the spirit or scope of the invention as expressed in the following claims.

What is claimed is:

1. In a machine tool, in combination, a table, a crossrail extending parallel to the surface of said table, a carriage mounted on said crossrail for movement therealong, means for moving said carriage along said crossrail, a ram mounted on said carriage for movement toward and away from said table, said ram being further movable with said carriage along said crossrail, means for moving said ram toward and away from said table, a toolhead pivotally mounted on that end of said ram which is disposed opposite to said table, a toolholder rotatably supported by said toolhead for rotation about an axis lying in a plane parallel to said crossrail and at right angles with the surface of said table, means for imparting rotation to said toolholder, a rotary cutting tool supported by said toolholder for simultaneous rotation therewith, said toolhead being pivotable relative to said ram about an axis at right angles with said crossrail and parallel to the surface of said table, and means for pivoting said toolhead relative to said ram wherein said tool has a first operative position such that its axis is perpendicular to the plane of said table and said tool has a second operative position such that its axis is at an angle other than a right angle with respect to the plane of said table.

2. In a machine tool, in combination, a table, a crossrail extending parallel to the surface of said table, a carriage mounted on said crossrail for movement therealong, means for moving said carriage along said crossrail a ram mounted on said carriage for movement toward and away from said table, said ram being further movable with said carriage along said crossrail, means for moving said ram toward and away from said table, a toolhead having a sleeve by which said toolhead is pivotally supported on that end of said ram which is disposed opposite to said table, a toolholder rotatably supported by said toolhead for rotation about an axis lying in a plane parallel to said crossrail and at right angles with the surface of said table, a spindle rotatably mounted within said sleeve, means for imparting rotation to said spindle, means for imparting the rotation of said spindle to said toolholder, a rotary cutting tool supported by said toolholder for simultaneous rotation therewith, said toolhead being pivotable relative to said ram about the axis of said sleeve extending at right angles with said crossrail and parallel to the surface of said table, and means for pivoting said toolhead via said sleeve relative to said ram wherein said tool has a first operative position such that its axis is perpendicular to the plane of said table and said tool has a second operative position such that its axis is at an angle other than a right angle with respect to the plane of said table.

3. In a machine tool, in combination, a table, a crossrail extending parallel to the surface of said table, a carriage mounted on said crossrail for movement therealong, means for moving said carriage along said crossrail, a ram mounted on said carriage for movement toward and away from said table, said ram being further movable with said carriage along said crossrail, means for moving said ram toward and away from said table, a toolhead substantially integrally provided with a sleeve rotatably supported at that end of said ram which is disposed opposite to said table, said toolhead being pivotable relative to said ram about the axis of said sleeve extending at right angles with said crossrail and parallel to the surface of said table, a first drive shaft within said ram, first bevel gear means for imparting the rotation of said first drive shaft to said sleeve and thus for pivoting said toolhead relative to said ram, a toolholder rotatably supported by said toolhead for rotation about an axis lying in a plane parallel to said crossrail and at right angles with the surface of said table, a spindle rotatably mounted within said sleeve, a second drive shaft within said ram, second bevel gear means for imparting the rotation of said second drive shaft to said spindle, third bevel gear means for imparting the rotation of said spindle to said toolholder, and a rotary cutting tool supported by said toolholder for simultaneous rotation therewith.

4. In a machine tool, in combination, a turntable, a crossrail extending parallel to the surface of said turntable, a carriage mounted on said crossrail for movement therealong, means for moving said carriage along said crossrail, a ram mounted on said carriage for movement toward and away from said turntable, said ram being further movable with said carriage along said crossrail, means for moving said ram toward and away from said turntable, a toolhead substantially integrally provided with a sleeve rotatably supported at that end of said ram which is disposed opposite to said turntable, said toolhead being pivotable relative to said ram about the axis of said sleeve extending at right angles with said crossrail and parallel to the surface of said turntable, a first drive shaft within said ram, means for imparting the rotation of said first drive shaft to said sleeve and thus for pivoting said toolhead relative to said ram, a toolholder rotatably supported by said toolhead for rotation about an axis lying in a plane parallel to said crossrail and at right angles with the surface of said turntable, a spindle rotatably mounted within said sleeve, a second drive shaft within said ram, means for imparting the rotation of said second drive shaft to said spindle, means for imparting the rotation of said spindle to said toolholder, a rotary cutting tool supported by said toolholder for simultaneous rotation therewith, a turning tool removably mounted directly on said end of said ram, locking means adapted to be actuated by said second drive shaft for securely but releasably locking said turning tool in position on said ram, and means for rotating said turntable relative to said turning tool.

5. The machine tool as recited in claim 4, wherein said locking means comprises a pinion shaft having teeth formed thereon and rotatably supported within said ram in axial alignment with said second drive shaft, said pinion shaft being further movable endwise toward and away from said second drive shaft, resilient means yieldably urging said pinion shaft away from said second drive shaft, said pinion shaft being adapted to be moved toward said second drive shaft against the force of said resilient means when said turning tool is mounted in position on said ram, clutch means arranged between said second drive shaft and said pinion shaft and adapted to be engaged upon movement of the latter toward the former, and a rack meshing with said teeth on said pinion shaft and serving as a wedge movable into and out of engagement with said turning tool, whereby upon engagement of said clutch means, said rack is moved into engagement with said turning tool for securely locking same in position on said ram by wedging action.

6. The machine tool as recited in claim 5, wherein said clutch means comprises a first clutch face formed on said second drive shaft, a second sleeve splinedly mounted on that end of said pinion shaft which is disposed opposite to said second drive shaft, and second sleeve being rotatable simultaneously with said pinion shaft but movable endwise relative to same, a second clutch face formed on one end of said second sleeve for interlocking engagement with said first clutch face, second resilient means yieldably urging said second sleeve toward said second drive shaft relative to said pinion shaft, and stop means formed on said end of said pinion shaft for limiting the motion of said second sleeve toward said second drive shaft.

7. The machine tool as recited in claim 1 wherein the axis of said toolhead is parallel to the plane of said table when said toolhead is in its second operative position.

8. The machine tool as recited in claim 1 further including a turning tool removably mounted directly to the end of said ram.

9. The machine tool as recited in claim 8 further comprising locking means for releasably locking said turning tool in position on said ram, and means for rotating said turntable relative to said turning tool.

10. The machine tool as recited in claim 2 wherein the axis of said toolhead is parallel to the plane of said table when said toolhead is in its second operative position.

11. The machine tool as recited in claim 2 further including a turning tool removably mounted directly to the end of said ram.

12. The machine tool as recited in claim 11 further comprising locking means for releasably locking said turning tool in position on said ram, and means for rotating said turntable relative to said turning tool.

* * * * *